United States Patent
Hoffman et al.

(10) Patent No.: US 11,401,817 B2
(45) Date of Patent: Aug. 2, 2022

(54) AIRFOIL ASSEMBLY WITH A COOLING CIRCUIT

(71) Applicant: General Electric Company, Schenectady, NY (US)

(72) Inventors: James Michael Hoffman, Hamilton Township, OH (US); Danielle Leigh Polizzi, West Chester, OH (US)

(73) Assignee: General Electric Company, Schenectady, NY (US)

( * ) Notice: Subject to any disclaimer, the term of this patent is extended or adjusted under 35 U.S.C. 154(b) by 700 days.

(21) Appl. No.: 15/343,849

(22) Filed: Nov. 4, 2016

(65) Prior Publication Data

US 2018/0128113 A1 May 10, 2018

(51) Int. Cl.
*F01D 5/18* (2006.01)
*F01D 9/04* (2006.01)
*F01D 25/12* (2006.01)

(52) U.S. Cl.
CPC ............... *F01D 5/18* (2013.01); *F01D 5/187* (2013.01); *F01D 9/041* (2013.01); *F01D 25/12* (2013.01); *F05D 2220/323* (2013.01); *F05D 2240/12* (2013.01); *F05D 2240/30* (2013.01); *F05D 2240/81* (2013.01); *F05D 2260/20* (2013.01); *F05D 2260/202* (2013.01); *Y02T 50/60* (2013.01)

(58) Field of Classification Search
CPC ............ F01D 5/187; F01D 5/18; F01D 25/12
See application file for complete search history.

(56) References Cited

U.S. PATENT DOCUMENTS

| 7,249,933 B2 * | 7/2007 | Lee ................ | F01D 5/143 416/97 R |
|---|---|---|---|
| 7,249,934 B2 * | 7/2007 | Palmer ............ | F01D 5/186 416/97 R |
| 7,922,451 B1 | 4/2011 | Liang | |
| 8,523,527 B2 * | 9/2013 | Lacy .............. | F01D 5/187 416/193 A |
| 8,540,486 B2 * | 9/2013 | Johnson .......... | F01D 5/186 416/96 R |
| 8,734,111 B2 * | 5/2014 | Lomas ............ | F01D 5/187 416/193 A |
| 8,840,370 B2 * | 9/2014 | Walunj ........... | F01D 5/186 416/193 A |

(Continued)

FOREIGN PATENT DOCUMENTS

| CN | 101473107 A | 7/2009 |
|---|---|---|
| CN | 101532399 A | 9/2009 |

(Continued)

OTHER PUBLICATIONS

First Chinese Office Action corresponding to Chinese Application No. 201711069752.3 dated Apr. 12, 2019.

(Continued)

*Primary Examiner* — Michael L Sehn
(74) *Attorney, Agent, or Firm* — McGarry Bair PC

(57) ABSTRACT

An airfoil assembly for a gas turbine engine including a blade, platform, and dovetail. The airfoil assembly further includes a cooling circuit including an interior chamber of the dovetail having fluid communication with the exterior of the airfoil assembly or with an interior chamber of the blade and at least one cooling passage.

26 Claims, 4 Drawing Sheets

(56) References Cited

U.S. PATENT DOCUMENTS

| | | | | |
|---|---|---|---|---|
| 8,845,289 B2* | 9/2014 | Walunj | ................... | F01D 5/186 |
| | | | | 416/193 A |
| 2011/0223004 A1* | 9/2011 | Lacy | ...................... | F01D 5/187 |
| | | | | 415/115 |

FOREIGN PATENT DOCUMENTS

| | | | |
|---|---|---|---|
| CN | 102191951 | A | 9/2011 |
| CN | 102312683 | A | 1/2012 |
| WO | 2015031160 | A1 | 3/2015 |

OTHER PUBLICATIONS

Bunker, Ronald S., Journal of Heat Transfer, Technology Review, "A Review of Shaped Hole Turbine Film-Colling Technology", Apr. 2005, 13 pages, Niskayuna, NY.

* cited by examiner

AIRFOIL ASSEMBLY WITH A COOLING CIRCUIT

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades, as well as vanes or nozzles, generally include one or more interior cooling circuits for routing the cooling air through the blade to cool different portions of the blade, and can include dedicated cooling circuits for cooling different portions of the blade, such as the leading edge, trailing edge, and tip of the blade.

BRIEF DESCRIPTION OF THE INVENTION

In one aspect, an airfoil assembly for a turbine engine comprises a platform having first and second opposing surfaces, an airfoil extending from the first surface of the platform and having an outer wall bounding an interior and defining a pressure side and a suction side extending axially from a leading edge to a trailing edge to define a chord-wise direction and extending radially between a root and a tip to define a span-wise direction, with the root being adjacent the platform, a cooling passage located within the airfoil and passing through the platform and into the interior of the airfoil, and at least one curvilinear cooling passage having an inlet in fluid communication with the cooling circuit and an outlet on the first surface.

In another aspect, a blade for a turbine engine comprises a platform having first and second opposing surfaces, a dovetail extending from the second surface, an airfoil extending from the first surface and having an outer wall bounding an interior and defining a pressure side and a suction side extending axially between a leading edge to a trailing edge to define a chord-wise direction and extending radially between a root and a tip to define a span-wise direction, with the root being adjacent the platform, a cooling circuit passing through the dovetail, platform and into the interior of the airfoil, and at least one curvilinear cooling passage having an inlet in fluid communication with the cooling circuit and an outlet on the first surface.

In yet another aspect, embodiments relate to a method of cooling an airfoil for a turbine engine, the method comprising passing cooling air through a curvilinear passage in a platform supporting the airfoil and emitting the cooling air through an outlet adjacent a root of the airfoil.

DESCRIPTION OF EMBODIMENTS OF THE INVENTION

Figure 1:
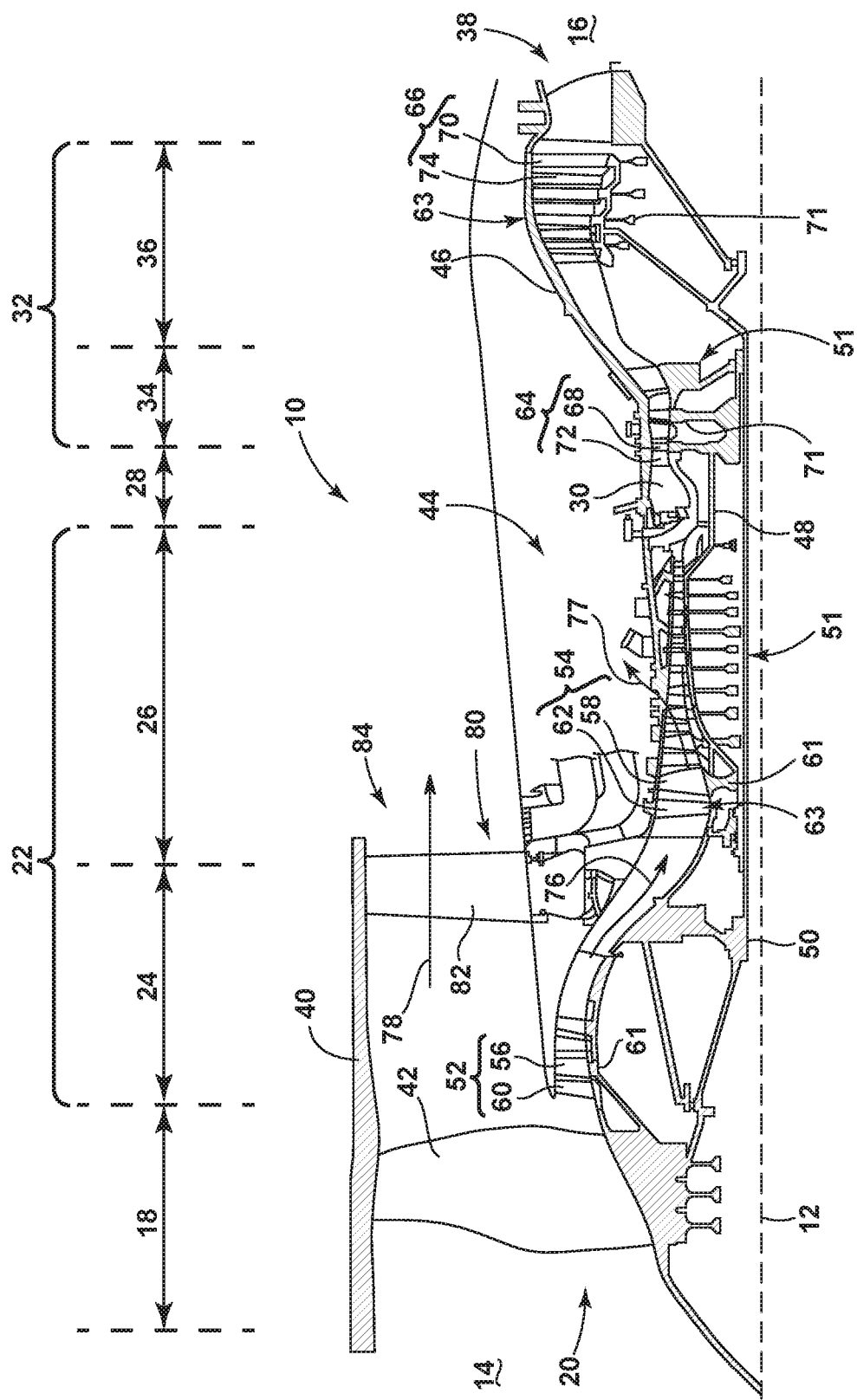
FIG. 1 is a schematic cross-sectional diagram of a gas turbine engine for an aircraft.

The described embodiments of the present invention are directed to curvilinear cooling passages or film holes in either or both of a platform or dovetail of a turbine blade. For purposes of illustration, the embodiments of the present invention will be described with respect to the turbine for an aircraft gas turbine engine. It will be understood, however, that the disclosure is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
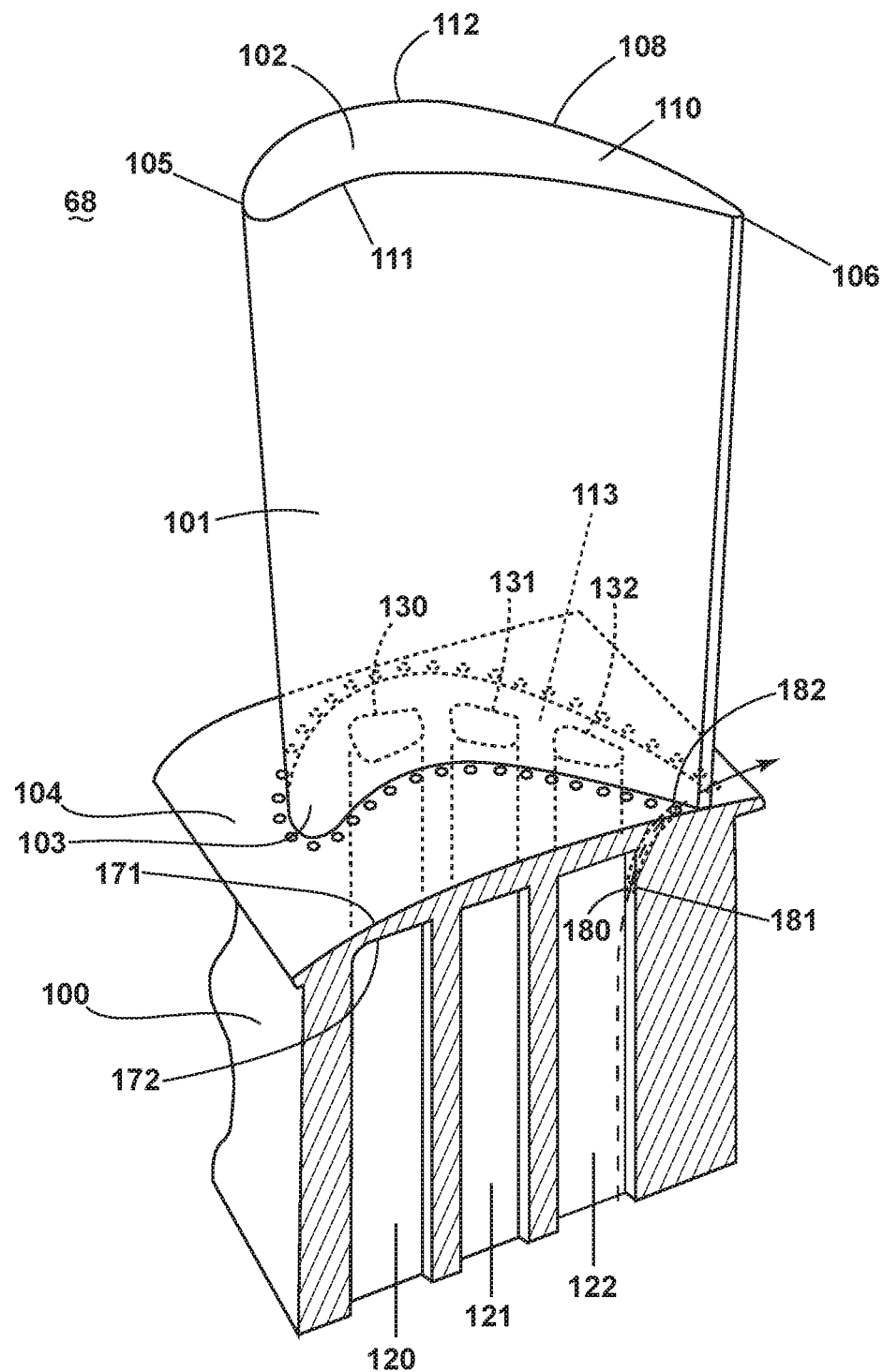
FIG. 2 is a schematic perspective view of a blade of the turbine engine of FIG. 1 according to a first embodiment of the invention.

FIG. 2 is a perspective view of an engine component in the form of one of the turbine blades 68 of the engine 10 from FIG. 1. The turbine blade 68 comprises a dovetail 100, an airfoil 101, and a platform 104. The platform 104 includes a first surface 171 and a second surface 172 where the second surface 172 opposes the first surface 171. The airfoil 101 extends from a tip 102 to a root 103 where the tip 102 and root 103 define a span-wise direction, and the root 103 can be adjacent to and integral with the platform 104. The airfoil 101 also has an outer wall 108 bounding an interior 110. The outer wall 108 defines a pressure side 111 and a suction side 112 extending axially between a leading edge 105 and a trailing edge 106 to define a chord-wise direction. The dovetail 100 is configured to mount to the turbine rotor disk 71 on the engine 10 such that the airfoil 101 projects radially from the centerline 12 in the span-wise direction. The dovetail 100 can include at least one inlet passage, exemplarily shown as a group of three inlet passages 120, 121, 122, each extending through the dovetail 100 and platform 104 to provide internal fluid communication with the airfoil 101 at a group of three passage outlets 130, 131, 132. The inlet passages 120, 121, 122 form part of a cooling circuit having one or more air flow paths (not shown) through the interior 110 of the turbine blade 68.

It should be understood that the inlet passages 120, 121, 122 as shown are exemplary and not meant to be limiting. More or fewer inlet passages can be used to provide a flow of fluid internal of the airfoil 101. It should be appreciated that the dovetail 100 is shown in cross-section such that the inlet passages 120, 121, 122 are housed within the body of the dovetail 100. It should be further appreciated that the embodiments as described herein are related to an airfoil 101, however, this should not be construed as limiting of the invention and additional engine components such as a blade, vane, strut, or shroud assembly, in non-limiting examples, can be substituted for the airfoil.

The cooling circuit can further include a curvilinear cooling passage 180 having an inlet 181 formed in the dovetail in fluid communication with the cooling circuit, and an outlet 182 formed on the first surface 171 of the platform 104 adjacent to the root 103 of the airfoil 101 and exterior to the airfoil 101. The outlet 182 can be located adjacent to a portion or an entirety of the blade 68, or it can also be located above the suction side 112 of the airfoil 101 along a rear half 113 of the airfoil 101. It is contemplated that the outlet 182 can be any shape including but not limited to a diffuser, an oval, a circle, or any other shape appropriate for the curvilinear cooling passage 180 known in the art. It is further contemplated that the curvilinear cooling passage 180 can be multiple passages with inlets 120, 121, 122 in fluid communication with the cooling circuit and outlets 130, 131, 132 as described herein.

Figure 3:
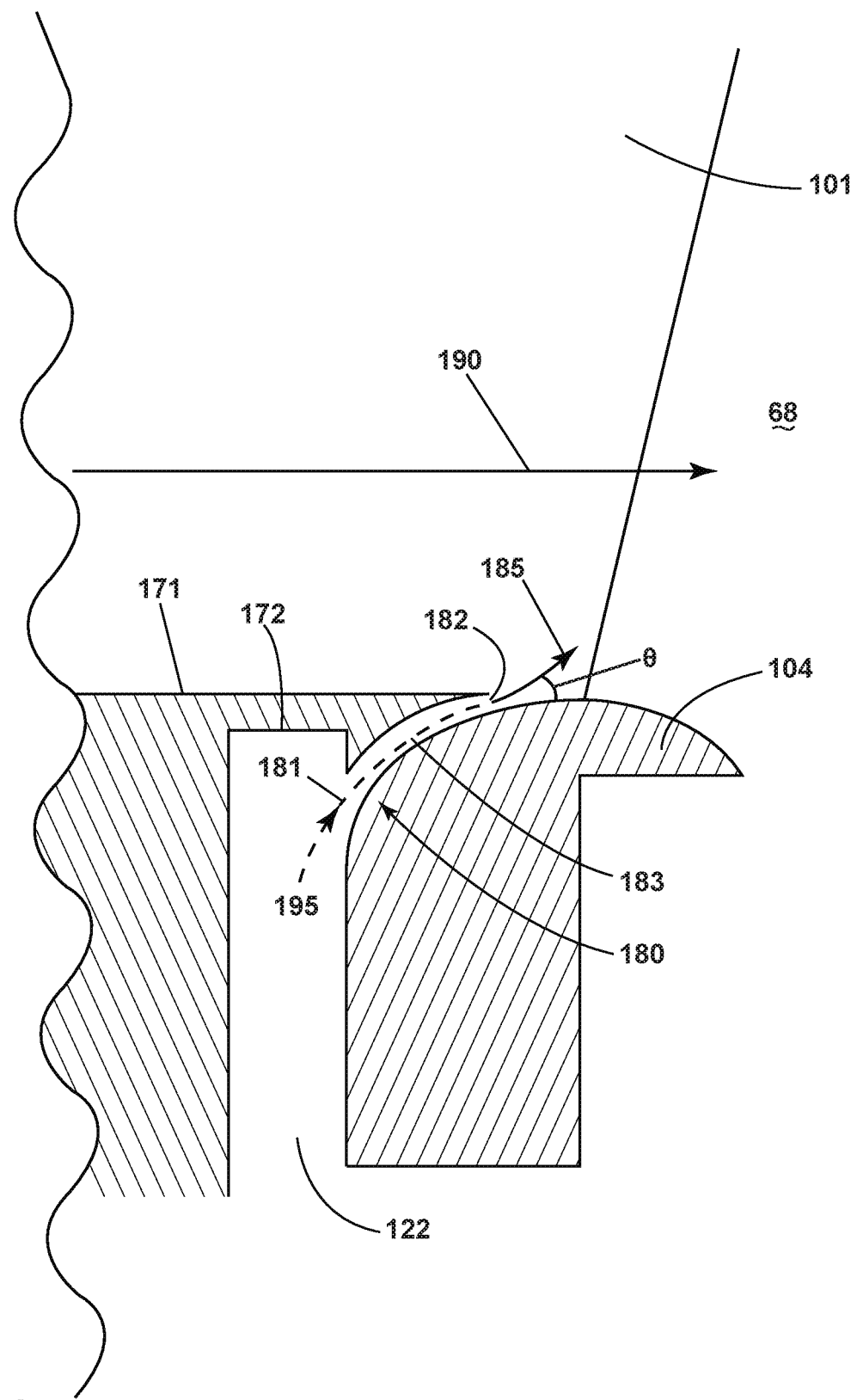
FIG. 3 is a schematic cross-sectional view of a portion of a cooling circuit in the blade of FIG. 2.

FIG. 3 is a cross-sectional view of a portion of the cooling circuit in FIG. 2. The curvilinear cooling passage 180 includes the inlet 181 in fluid communication with the cooling circuit and the outlet 182 on the first surface 171 of the platform 104. A centerline 183 extends through the curvilinear cooling passage 180. At the outlet 182, the centerline 183 defines a path 185 that forms an included angle θ that, when measured from the first surface 171, is an acute angle less than 30 degrees. In some embodiments, the included angle θ can also be less than 20 degrees. In addition, an exemplary external flow streamline 190 is illustrated as running substantially parallel to the platform 104. It is understood that the curvilinear cooling passage 180 as described above can be applied to any of the exemplary curvilinear passages in all embodiments as described herein and is not meant to be limiting.

Figure 4:
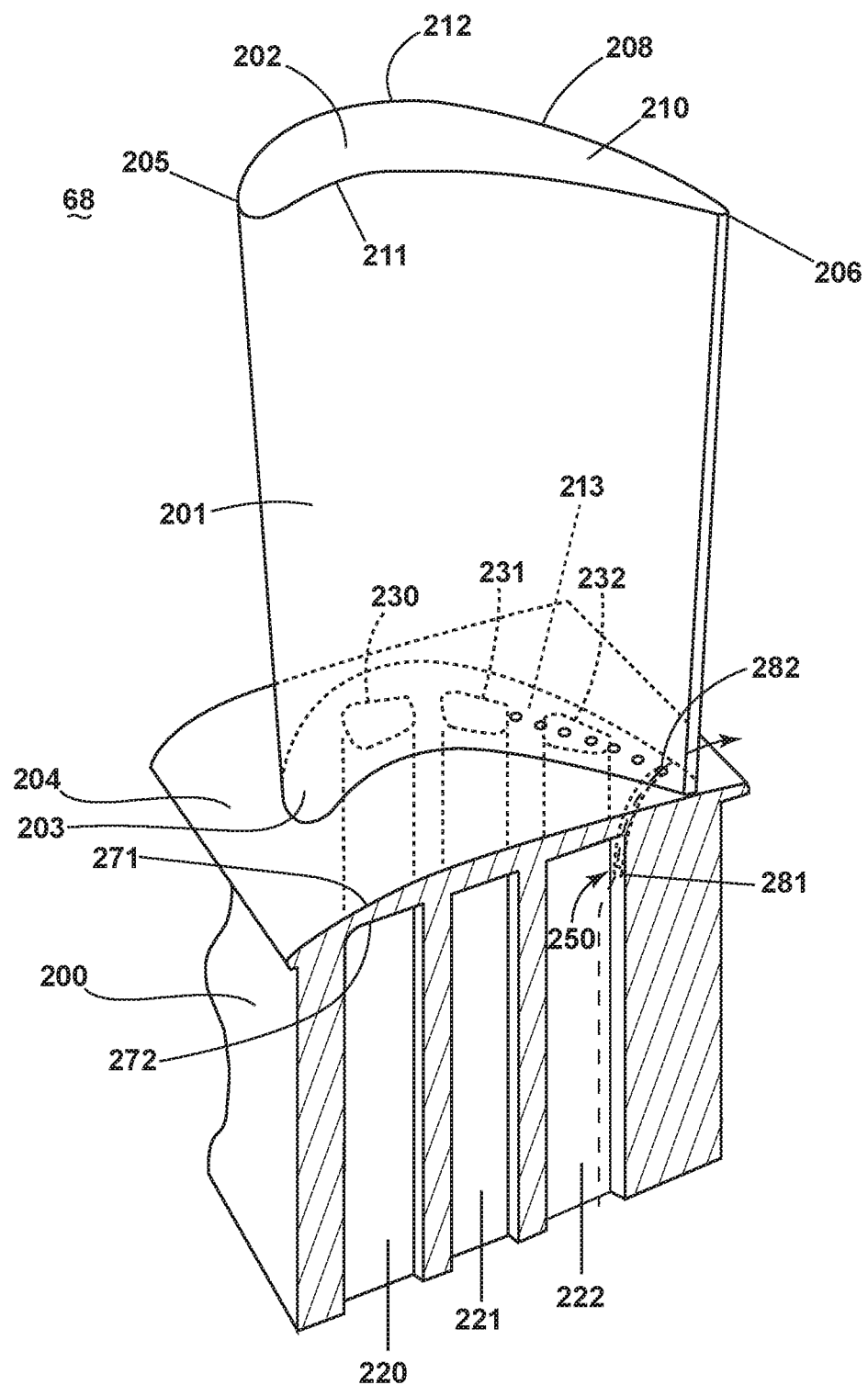
FIG. 4 is a schematic perspective view of a blade of the turbine engine of FIG. 1 according to a second embodiment of the invention.

Turning to FIG. 4, a second embodiment similar to the first embodiment is illustrated with like parts identified by like numerals increasing by 100. It is to be understood that the description of the like parts of the first embodiment applies to the second embodiment unless otherwise noted.

A cooling circuit in a turbine blade 68 is illustrated having a curvilinear cooling passage 280 with an inlet 281 in fluid communication with the cooling circuit and an outlet 282 located on a first surface 271 of a platform 204 on an interior 210 of an airfoil 201. The outlet 282 can be located at, but not limited to, a rear half 213 of the interior 210 of the airfoil 201 in the chord-wise direction. It is also contemplated that the curvilinear cooling passage 280 can be multiple passages with inlets 281 in fluid communication with the cooling circuit provided at multiple locations within the interior 210 and outlets 282 on the first surface as described herein.

In all embodiments described herein the formation of the curvilinear cooling passages 180, 280 can be achieved by methods including, but not limited to, additive manufacturing. It should be appreciated that additive manufacturing processes enable the manufacture of intricate parts or features at reduced cost and improved accuracy compared with traditional manufacturing methods. Casting and drilling can also be contemplated, or any other appropriate form of manufacturing known in the art.

A method of cooling the airfoil 101 for the turbine engine 10 includes passing the cooling air 195 through the curvilinear cooling passage 180 and emitting the cooling air 195 through the outlet 182. The cooling air is emitted along the path 185 that can form an included angle θ relative to the platform 104. The cooling air 195 can be emitted at an aft half of the airfoil 101, and can also be emitted adjacent a root 103 of the airfoil 101 or in the interior of the airfoil 101. The included angle θ can be less than 20 degrees or as close to zero as possible such that the cooling air emerging from the outlet 182 can align with the flow streamline 190 to form a cooling film on the first surface 171.

The curvilinear cooling passage 180 can be positioned to supply cooling air to locations in the airfoil 101 or platform 104 that were previously unreachable using line-of-sight or other known drilling methods. It is also contemplated that the outlet 182 of the curvilinear cooling passage 180 can be aligned with the external flow streamline 190 about the airfoil 101 in order to reduce areas of low air flow or flow separation in or around the airfoil 101 or platform 104, resulting in improved cooling efficacy. It can be further contemplated that multiple curvilinear cooling passages 180 can be formed in a group of nearby cavities in the airfoil 101 or platform 104 in order to control environmental conditions near the blade 68 such as pressure ratio, blowing ratio, or backflow margin.

It should be appreciated that application of the disclosed design is not limited to turbine engines with fan and booster sections, but is applicable to turbojets and turbo engines as well.

This written description uses examples to disclose the present invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil assembly for a turbine engine comprising:
   a. a platform having first and second opposing surfaces;
   b. an airfoil extending from the first surface and having an outer wall bounding an interior and defining a pressure side and a suction side extending axially between a leading edge to a trailing edge to define a chord-wise direction and extending radially between a root and a tip to define a span-wise direction, with the root being adjacent the platform;
   c. a cooling circuit passing through the platform and into the interior of the airfoil, the cooling circuit extending in the span-wise direction through the platform and into the interior of the airfoil; and
   d. at least one curvilinear cooling passage having a single continuous bend including and extending between an inlet in direct fluid communication with the cooling circuit and an outlet on the first surface.

2. The airfoil assembly of claim 1 wherein the at least one curvilinear cooling passage defines a centerline, which at the outlet, defines an included angle with the first surface.

3. The airfoil assembly of claim 2 wherein the included angle is less than 30 degrees.

4. The airfoil assembly of claim 3 wherein the included angle is less than 20 degrees.

5. The airfoil assembly of claim 1 wherein the at least one curvilinear cooling passage defines a plurality of curvilinear cooling passages, each extending between a corresponding inlet and outlet.

6. The airfoil assembly of claim 5 wherein at least some of the plurality of curvilinear cooling passages have their outlets aligned with a flow streamline about the airfoil.

7. The airfoil assembly of claim 1 wherein the at least one curvilinear cooling passage is cast within the platform.

8. The airfoil assembly of claim 1 wherein the outlet is located in a rear half of the airfoil in the chord-wise direction.

9. The airfoil assembly of claim 8 wherein the outlet is located above the suction side.

10. The airfoil assembly of claim 1 wherein the outlet is positioned at the root of the airfoil.

11. The airfoil assembly of claim 1 wherein the outlet on the first surface is located within the interior of the airfoil.

12. A blade for a turbine engine comprising:
   a. a platform having first and second opposing surfaces;
   b. a dovetail extending from the second surface;
   c. an airfoil extending from the first surface and having an outer wall bounding an interior and defining a pressure side and a suction side extending axially between a leading edge to a trailing edge to define a chord-wise direction and extending radially between a root and a tip to define a span-wise direction, with the root being adjacent the platform;
   d. a cooling circuit passing through the dovetail, platform and into the interior of the airfoil, the cooling circuit extending in the span-wise direction a distance through the dovetail, platform, and into the interior of the airfoil; and
   e. at least one curvilinear cooling passage having a single continuous bend including and extending between an inlet in direct fluid communication with the cooling circuit and an outlet on the first surface.

13. The blade of claim 12 wherein the at least one curvilinear cooling passage defines a centerline, which at the outlet, defines an included angle with the first surface.

14. The blade of claim 13 wherein the included angle is less than 30 degrees.

15. The blade of claim 14 wherein the included angle is less than 20 degrees.

16. The blade of claim 12 wherein the at least one curvilinear cooling passage defines a plurality of curvilinear cooling passages, each extending between a corresponding inlet and outlet.

17. The blade of claim 16 wherein at least some of the plurality of curvilinear cooling passages have their outlets aligned with a flow streamline about the airfoil.

18. The blade of claim 12 wherein the at least one curvilinear cooling passage is cast within the platform.

19. The blade of claim 12 wherein the outlet is located in a rear half of the airfoil in the chord-wise direction.

20. The blade of claim 19 wherein the outlet is located above the suction side.

21. The blade of claim 12 wherein the at least one curvilinear cooling passage extends through the dovetail and the platform.

22. A method of cooling an airfoil for a turbine engine, the method comprising:

supplying cooling air to a cooling circuit within a dovetail and a platform having first and second opposing surfaces, wherein the airfoil extends from the first surface and the dovetail extends from the second surface, the cooling circuit extending in a span-wise direction a distance through the dovetail, the platform and into an interior of the airfoil;

passing the cooling air through a curvilinear passage having a single continuous bend in the platform, the single continuous bend of the curvilinear passage including and extending between an inlet below the second surface at a first height and an outlet at the first surface at a second height, with the inlet in direct fluid communication with the cooling circuit; and emitting the cooling air through the outlet of the curvilinear passage, with the outlet located in the first surface adjacent a root of the airfoil.

23. The method of claim 22 further comprising emitting the cooling air from the outlet along a path forming an included angle of less than 30 degrees relative to the platform.

24. The method of claim 23 wherein the included angle is less than 20 degrees.

25. The method of claim 22 further comprising emitting the cooling air at an aft half of the airfoil.

26. The method of claim 25 further comprising emitting the cooling air adjacent a suction side of the airfoil.

* * * * *